United States Patent
Gollamudi et al.

(10) Patent No.: US 7,894,402 B2
(45) Date of Patent: Feb. 22, 2011

(54) HIGH RATE PACKET DATA SPATIAL DIVISION MULTIPLE ACCESS (SDMA)

(75) Inventors: Sridhar Gollamudi, Morris Plains, NJ (US); Pantelis Monogioudis, Randolph, NJ (US); Robert Atmaram Soni, Morris Plains, NJ (US); Harish Viswanathan, Morristown, NJ (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 1098 days.

(21) Appl. No.: 11/106,627

(22) Filed: Apr. 15, 2005

(65) Prior Publication Data

US 2006/0251036 A1    Nov. 9, 2006

(51) Int. Cl.
*H04B 7/216* (2006.01)
(52) U.S. Cl. .................. 370/335; 370/209; 370/491; 455/452.2; 455/561
(58) Field of Classification Search ................ 370/209, 370/491; 455/452.2, 561
See application file for complete search history.

(56) References Cited

U.S. PATENT DOCUMENTS

| | | | | |
|---|---|---|---|---|
| 6,028,852 | A * | 2/2000 | Miya et al. .................. | 370/335 |
| 6,721,349 | B1 | 4/2004 | Willenegger et al. | |
| 6,996,069 | B2 * | 2/2006 | Willenegger ................ | 370/252 |
| 7,206,598 | B2 * | 4/2007 | Attar et al. .................. | 455/522 |
| 7,206,607 | B2 * | 4/2007 | Kim et al. .................. | 455/562.1 |
| 7,480,278 | B2 * | 1/2009 | Pedersen et al. ............ | 370/335 |
| 2002/0031082 | A1 | 3/2002 | Lundby et al. | |
| 2002/0186779 | A1 | 12/2002 | Gollamudi | |
| 2003/0035490 | A1 | 2/2003 | Gollamudi | |
| 2004/0066754 | A1 | 4/2004 | Hottinen | |
| 2004/0137948 | A1 | 7/2004 | Benning et al. | |
| 2004/0160914 | A1 | 8/2004 | Sarkar | |
| 2004/0179544 | A1 * | 9/2004 | Wilson et al. ............... | 370/442 |
| 2004/0214606 | A1 | 10/2004 | Wichman et al. | |
| 2004/0246924 | A1 | 12/2004 | Lundby et al. | |
| 2005/0020295 | A1 | 1/2005 | Attar et al. | |
| 2005/0037799 | A1 * | 2/2005 | Braun et al. ................. | 455/525 |
| 2005/0096090 | A1 * | 5/2005 | Nagaraj .................... | 455/562.1 |
| 2005/0124369 | A1 * | 6/2005 | Attar et al. .................. | 455/522 |
| 2006/0067205 | A1 * | 3/2006 | Jung et al. .................. | 370/203 |

OTHER PUBLICATIONS

Wu, Qiang et al. "The cdma2000 High Rate Packet Data System." QUALCOMM Proprietary, 80-H0593-1, Revision A, Mar. 26, 2002. http://3gpp2.com/Public_html/specs/C.S0024-A_v1.0_040331. pdf (Sections 1.11, 12.1, 13.2, 13.3, and 14.2).
International Search Report and Written Opinion dated Oct. 17, 2006.

* cited by examiner

*Primary Examiner*—Edward Urban
*Assistant Examiner*—Christian A Hannon
(74) *Attorney, Agent, or Firm*—Harness, Dickey & Pierce, P.L.C.

(57) ABSTRACT

Spatial Division Multiple Access (SDMA) may be implemented in both the forward and reverse link directions through the use of, for example, a sector-wide primary pilot channel and one or more beamformed secondary pilot channels (secondary pilot channel).

20 Claims, 7 Drawing Sheets

HIGH RATE PACKET DATA SPATIAL DIVISION MULTIPLE ACCESS (SDMA)

BACKGROUND OF THE INVENTION

1. Field of the Invention

Example embodiments of the present invention relate to methods for transmitting data in wireless communication systems.

2. Description of the Related Art

FIG. 1 illustrates an example of a beamformed sector (or coverage area) provided by an access network 100 in a conventional wireless communications system. The conventional wireless communications system may be, for example, a code division multiple access (CDMA) system. As discussed herein, an access network may collectively denote one or more base stations and/or a radio network controller (RNC). As shown, one sector of the access network may include a number of antennas. In FIG. 1, three antennas 102, 104 and 106 are shown for example purposes. The antennas 102, 104 and 106 produce respective directional beams along respective directions 110, 112 and 114. The beam along direction 110 from antenna 102 has a coverage envelope or coverage area 118, the beam along direction 112 has a coverage envelope 120 and the beam along direction 114 has a coverage envelope 122. Hereinafter, the beam will be referenced by their respective direction; namely, in most instances, the beam will be referenced as beam 110, beam 112 and beam 114.

As illustrated in FIG. 1, the access network 100 may communicate with one or more access terminals 124, 126, 128, and 130 in a forward link by transmitting messages in a forward link channel and in a reverse link by transmitting messages in a reverse link channel. An access terminal may denote an individual user terminal, mobile station, etc. As discussed herein the forward link refers to a downlink transmission from the access network 100 to access terminals 124, 126, 128, and 130, and a reverse link refers to an uplink transmission from access terminals 124, 126, 128, and 130 to the access network 100.

As shown in FIG. 1, access terminals 128 and 130 are located in coverage envelope 118, and may communicate with the access network 100 in forward and reverse link channels allocated in beam 110. Access terminal 126 is located in coverage envelope 120, and may communicate with the access network 100 in the forward link and reverse link channels allocated in beam 112. Access terminal 124 is located in coverage envelope 122, and may communicate with the access network 100 in the forward link and reverse link channels over beam 114.

A forward link channel in each of the beams 110, 112, and 114 includes a forward pilot, a forward medium access control channel and one of a forward traffic channel or a forward control channel. The forward pilot, the medium access control channel, and traffic or control channel may be time-division multiplexed into time slots of length 2048 chips (1.66 ... ms), and transmitted to access terminals 124, 126, 128, and 130 at the same power level. Each slot may be further divided into two half slots, each of which contains a forward pilot located at the midpoint of the half slot.

FIG. 2 illustrates example half slots 510, 520, and 530, which may be transmitted over beams 110, 112, and 114, respectively. As shown in FIG. 2, each of the half slots 510, 520, and 530 include the same forward pilot 512 time multiplexed with data transmitted over the forward medium access control MAC and forward data traffic channel DATA.

In conventional wireless communications systems, the forward pilot 512 may identify the serving access network 100 (i.e., the source of transmission) to the access terminals 124, 126, 128, and 130, and may be used in determining a maximum forward link data rate by measuring a signal-to-interference and noise ratio (SINR) of the forward pilot 512. The maximum forward link data rate may represent a forward link data rate at or below which data may be transmitted.

For example, each access terminal 124, 126, 128, and 130 may measure a signal-to-interference and noise ratio of (SINR) the forward pilot 512 transmitted sector wide, or in other words, to each of the access terminals 124, 126, 128, and 130. Each access terminal 124, 126, 128, and 130 may then use the measured SINR to predict a carrier-to-interference C/I ratio of a next transmission in each access terminal's respective forward link channel. The predicted C/I may then be used in determining a maximum forward link data rate.

Referring again to the sector of FIG. 1, each access terminal 124, 126, and 128 may predict a C/I ratio and subsequently a maximum forward link data rate based on the same forward pilot 512. However, each of the beams 110, 112, and 114 may have distinct channel characteristics (e.g., C/I ratios), and thus may be capable of a higher maximum forward link data rate than estimated based on the SINR of the forward pilot 512.

SUMMARY OF THE INVENTION

An example embodiment of the present invention provides a method, which may include transmitting a primary pilot that identifies a source of transmission, and transmitting a number of secondary pilots, each secondary pilot associated with a different beam transmitted by the source.

Example embodiments of the present invention may further include transmitting data at or below a data rate determined based on at least one characteristic of a secondary pilot. In example embodiments of the present invention, the number of secondary pilots may be beamformed and/or the characteristic may be a signal-to-interference and noise ratio.

Example embodiments of the present invention may further include receiving a control message indicating the determined data rate, and transmitting data at or below the determined data rate in response to the received control message.

In example embodiments of the present invention, the control message is a Data Rate Control (DRC) message.

Example embodiments of the present invention may further include receiving a selection signal selecting at least one secondary pilot channel for allocation, and allocating at least one secondary pilot in response to the received selection signal.

In example embodiments of the present invention, the selection signal is received over a portion of a control channel. In example embodiments of the present invention, the control channel may be a data source control (DSC) channel and the portion of the control channel may be an explicit pilot signal portion of the control channel.

Example embodiments of the present invention may further include allocating a secondary pilot for each beam, receiving an indicator indicating the determined data rate, selecting a beam for transmitting data based on the received indicator, and transmitting data over the selected beam.

In example embodiments of the present invention, each of the secondary pilots may be orthogonal to one another, and/or each of the secondary pilots may be chip synchronous.

In example embodiments of the present invention, each of the secondary pilots may be allocated using a matrix, which may be a Hadamard matrix.

Another example embodiment of the present invention may include receiving a primary pilot that identifies a source of transmission, and receiving at least one secondary pilot associated with a beam transmitted by the source.

Example embodiments of the present invention may further include determining a data rate based on a characteristic of the secondary pilot, indicating the determined data rate to a network, and receiving data at or below the determined data rate.

BRIEF DESCRIPTION OF THE DRAWINGS

The present invention will become more fully understood from the detailed description given herein below and the accompanying drawings, wherein like elements are represented by like reference numerals, which are given by way of illustration only and thus are not limiting of the present invention and wherein.

DETAILED DESCRIPTION OF THE EMBODIMENTS

Example embodiments of the present invention may improve quality of service metrics such as, for example, throughput in communication systems by improving the reusability of system resources.

Example embodiments of the present invention will be described herein with reference to the sector of the conventional wireless communications system illustrated in FIG. 1. However, it will be understood that this is done for explanation purposes only, and the present invention is not limited in implementation to this system or the number of beams shown.

Figure 2:
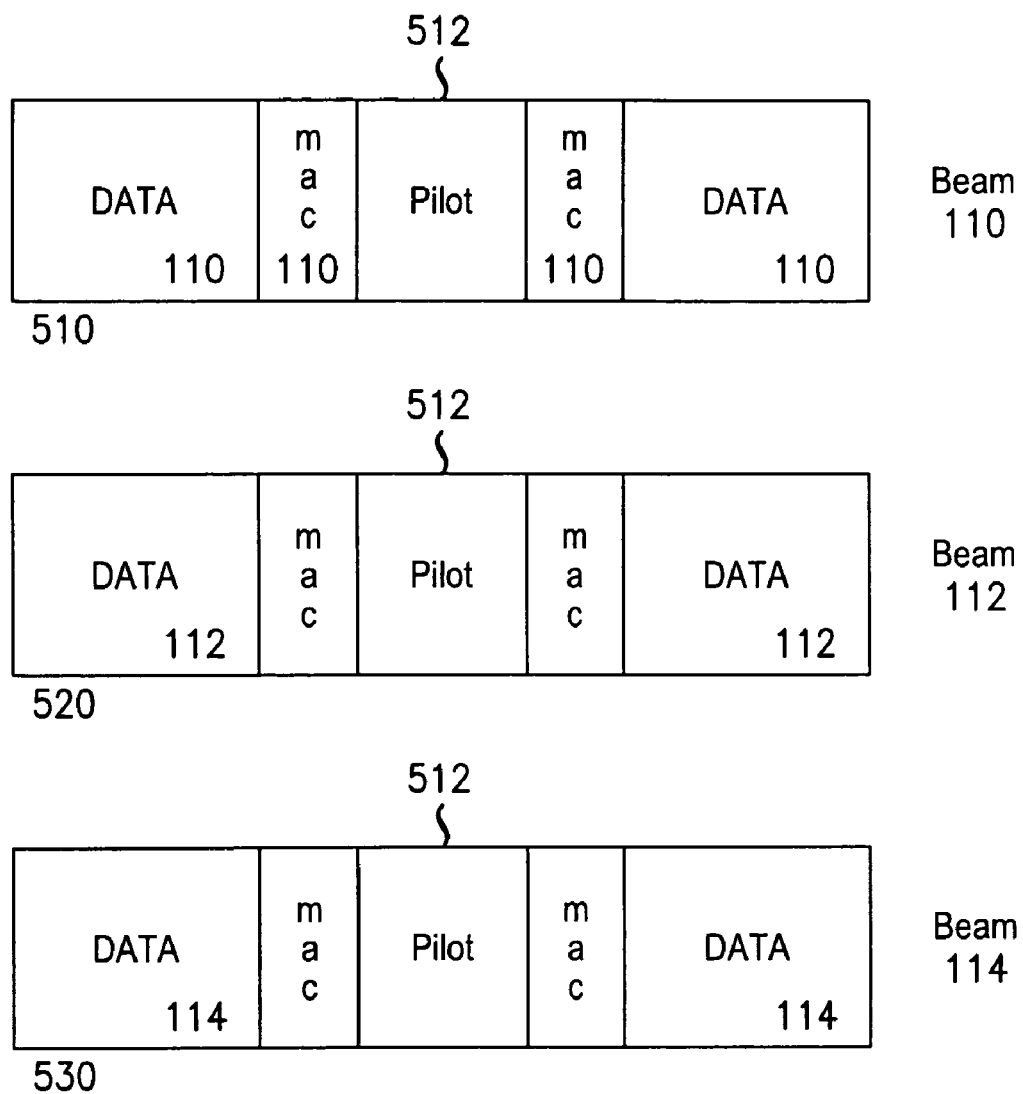
FIG. 2 illustrates an example of a conventional CDMA frame.
Figure 3:
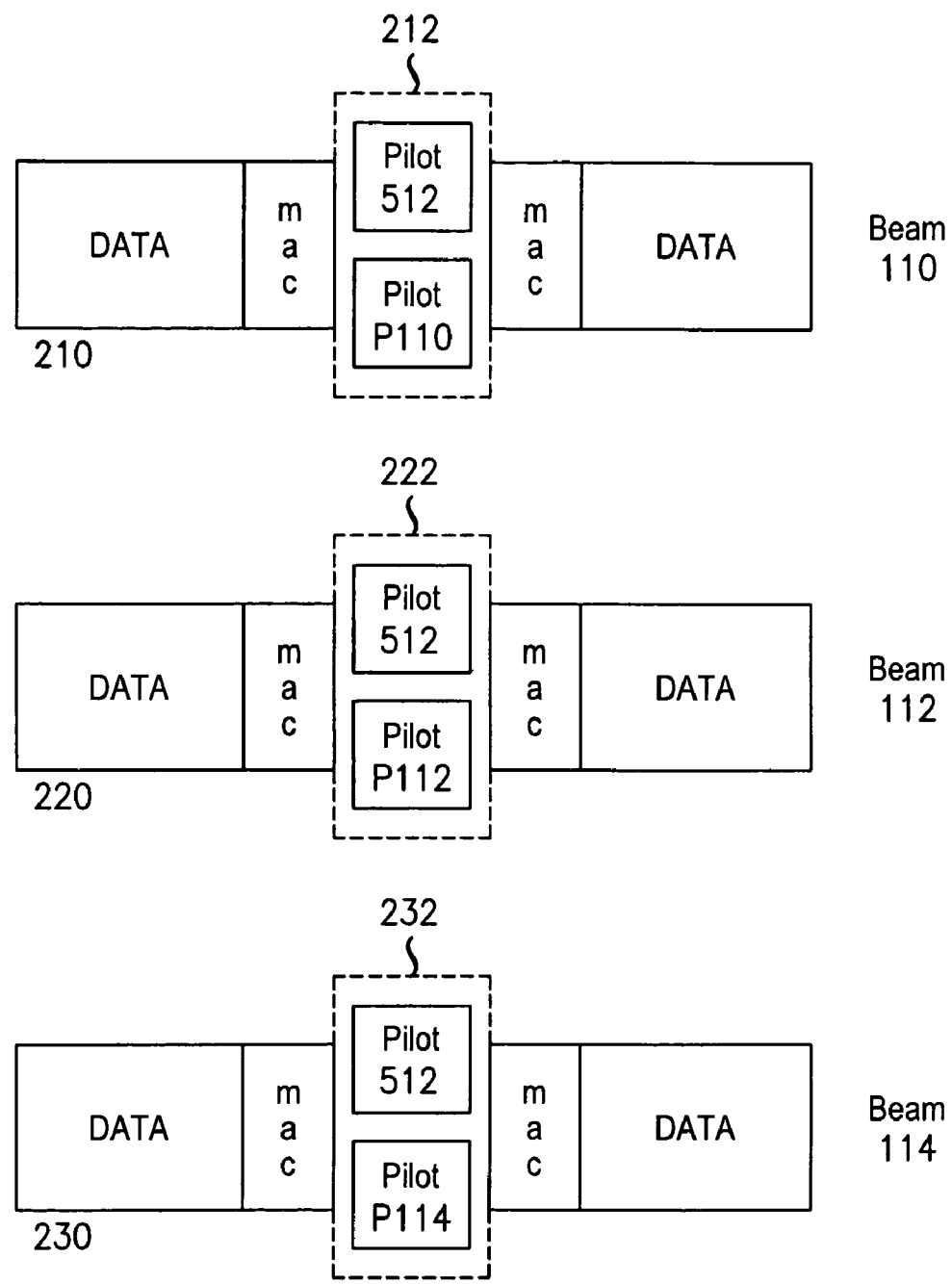
FIG. 3 illustrates a forward link transmission frame, according to an example embodiment of the present invention.

FIG. 3 illustrates examples of forward link frames (e.g., CDMA frames) 210, 220, and 230 transmitted along beams 110, 112 and 114, respectively, according to an example embodiment of the present invention. As shown in FIG. 3, forward link frames 210, 220, and 230 may be similar to the conventional CDMA frames 510, 520, and 530, respectively, as illustrated in FIG. 2 and discussed above. However, as shown in FIG. 3, each of the time multiplexed pilots 212, 222, and 232 may be divided into a forward (or primary) pilot 512, as discussed above, and a respective secondary pilot. Namely, the forward link frame 210 includes the primary pilot 512 and a secondary pilot P110, the forward link frame 220 includes the primary pilot 512 and a secondary pilot P112, and the forward link frame 230 includes the primary pilot 512 and a secondary pilot P114.

As discussed above, the primary pilot 512 may be allocated sector wide (e.g., in each of the beams 110, 112, and 114), and may be received by each access terminal 128, 126, and 124.

As further discussed above, the primary pilot 512 identifies the serving access network 100 (i.e., the source of transmission) to the access terminals 124, 126, 128, and 130. On the other hand, the secondary pilots P110, P112, and P114, may be beamformed. That is, each of the secondary pilots P110, P112, and P114 may be allocated to one of the beams 110, 112, and 114, respectively, such that each beam has a distinct secondary pilot. Each of the secondary pilot signals P110, P112, and P114 may also identify each of the beams 110, 112, and 114, respectively.

In example embodiments of the present invention, each access terminals 124, 126, and 128 may determine a maximum forward link data rate, at or below which data may be transmitted ion the forward link, based on characteristics of secondary pilots. An example will now be discussed with regard to access terminal 124 and beam 114, however, it will be understood that the same procedure may be performed for each access terminal 126, 128, and 130 and each beam 110, 112, and 114.

For example, access terminal 124 may measure a characteristic (e.g., an SINR) of a received secondary pilot P114. The access terminal 124 may then use measured characteristic of the secondary pilot P114 to predict another characteristic (e.g., C/I ratio) in beam 114. The access terminal 124 may then estimate a maximum forward link data rate in beam 114. In example embodiments of the present invention, the access terminal 124 may determine a maximum forward link data rate based on the secondary pilot P114, and thus may be capable of a higher maximum forward link data rate when compared to conventional estimations based on the SINR of the forward pilot 512.

Referring again to FIG. 3, each of the secondary pilots P110, P112, and P114 transmitted may be different from one another, may be transmitted orthogonal or chip synchronous (or code multiplexed) to one another, and may be transmitted orthogonal or chip synchronous (or code multiplexed) to the primary pilot 512.

Figure 1:
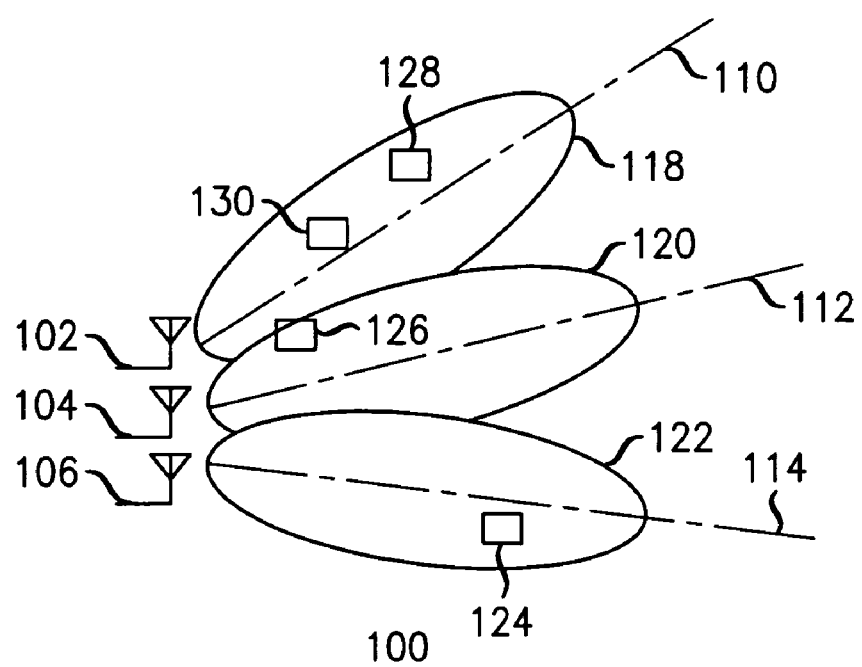
FIG. 1 illustrates a sector or coverage area provided by an access network 100 in a wireless communication system.

For example, both the primary pilot 512 and the secondary pilots P110, P112, and P114 may be allocated from a static matrix (e.g., a Hadamard matrix) located at the access network 100 of FIG. 1. The static matrix may be an N×N matrix, in which each entry represents a chip or bit (e.g., a binary 1 or 0), and each row or column of N-entries represents a respective pilot or pilot sequence (collectively referred to herein as a pilot). For example, primary and secondary pilots may have lengths of 96 chips, and thus, in example embodiments of the present invention, the static matrix may be a 96×96 Hadamard matrix, which includes 192 possible pilots. Of the 192 possible pilots, each row may be orthogonal to the other rows and, similarly, each column may be orthogonal to the other columns. Accordingly, the static matrix may include two groups of 96 orthogonal or chip synchronous pilots. In example embodiments of the present invention, each of the secondary pilots P110, P112, and P114 may be allocated orthogonal pilots corresponding to rows or columns of the static matrix. A more detailed discussion of how the matrix may be used in allocating a secondary pilot will be discussed in more detail below.

Secondary pilots P110, P112, and P114 (of FIG. 3) may be allocated using a feature similar to a data source control (DSC) mechanism in conventional wireless networks. For example, forward link secondary pilots may be allocated using a fast beam allocation feature.

A fast beam allocation feature, according to an example embodiment of the present invention, may utilize, for example, an implicit selection mode and/or an explicit selection mode. The explicit selection mode may be referred to as explicit pilot selection (EPS) and may allow for an access terminal 124 to indicate to the access network 100, a specific (e.g., explicitly request) secondary pilot to allocate during a next valid transmission time.

Referring again to FIG. 1, for example, access terminal 124 may transmit an EPS signal over a portion of a control channel in the reverse link. Namely, the access terminal 124 may transmit an explicit pilot selection (EPS) signal over a portion of the data source control (DSC) channel in a control portion of a reverse link channel.

In order to send an explicit pilot selection signal to the access network 100, the access terminal 124 may partition bandwidth allocated to the data source control (DSC) channel into, for example, at least two parts. A first part may be used for transmitting conventional data source control messages, and a second part may be used to transmit an explicit pilot selection signal, which may indicate a selected beam 114 over which the access terminal 124 may receive data, and subsequently an associated secondary pilot P114. The first and second parts may be coded in the same manner as conventional data source control channel. In order to compensate for the decreased bandwidth in the data source control channel, the amplitude (e.g., transmit power) of the data source control channel may be increased by a factor, which may be proportional to the factor by which the bandwidth has been decreased. For example, if the data source control channel bandwidth is divided by two, the transmit power of the data source control channel may be increased by a factor of two. In example embodiments of the present invention, up to eight secondary pilots may be allocated, however, this number may be increased by using, for example, complementary coding.

For example, in a soft-handoff situation, the access terminal 124 may receive the secondary pilots P110, P112 and P114, and select the secondary pilot having the greatest SINR. The access terminal 124 then transmit an EPS signal indicating the selected secondary pilot over a portion of a control channel in the reverse link, as discussed above.

In another example, the access network 100 may request an EPS signal from the access terminal 124 using higher layer signaling (e.g., MAC signaling).

Figure 4:
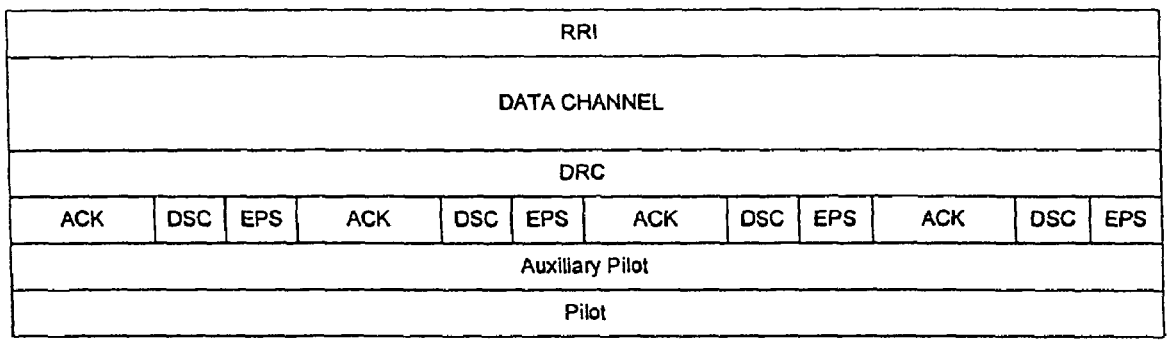
FIG. 4 illustrates a reverse traffic channel frame, according to an example embodiment of the present invention.

FIG. 4 illustrates an example of a reverse link frame, which may be transmitted in a reverse link channel from, for example, access terminal 124 to the access network 100 illustrated in FIG. 1.

As shown in FIG. 4, an explicit pilot selection channel (EPS in FIG. 4) may be sent in the reverse link channel either, for example, code multiplexed or time multiplexed with the data source control channel. If, for example, the explicit pilot selection channel is time multiplexed with the data source control channel, a Walsh cover employed by both the data source control channel and the explicit pilot selection channel may be W(16, 12) as compared to W(32, 12), which may be used in a conventional data source control channel. As discussed above, an adjustment of the amplitude of the data source control channel may compensate for the partitioning of the bandwidth of the data source control channel.

Having received the indicated secondary pilot in the EPS signal, the access network may use this information as an indicator of the coverage envelope that the access terminal is in, in turn, the beam that the access terminal receives the best, and therefore the beam over which data may be received.

Figure 5:
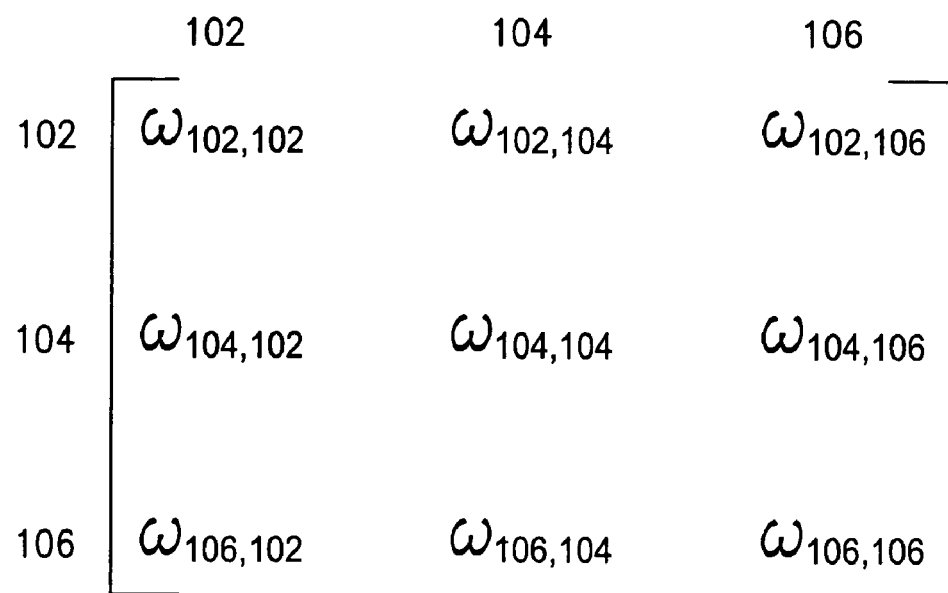
FIG. 5 illustrates an implicit pilot selection method, according to an example embodiment of the present invention.

FIG. 5 illustrates an example embodiment of the implicit pilot selection method, according to the present invention. For explanation purposes, the implicit pilot selection method, according to example embodiments of the present invention, will also be discussed with regard to FIG. 1. As shown in FIG. 1, each antenna 102, 104, and 106 may have an associated deterministic weight (estimated by the access network 100) used for directing (or steering) the antenna toward the spatial directions 110, 112, and 114, respectively.

Referring to FIG. 5, at step S700 the access network 100 may generate a spatial correlation matrix $R_{yy}$, including weights $w_j$, each which illustrate a spatial correlation between antennas 102, 104, and 106, for example, in the j-direction.

Figure 6:
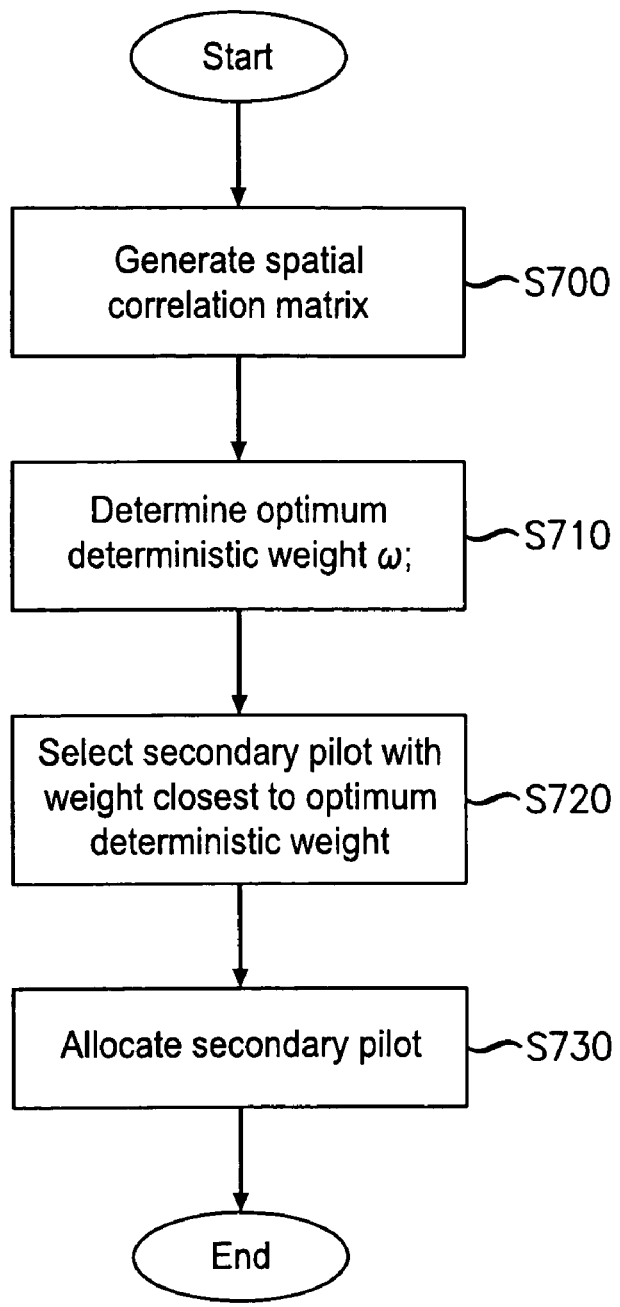
FIG. 6 illustrates a spatial correlation matrix, according to an example embodiment of the present invention.

More specifically, for the sector shown in FIG. 1, the access network 100 may generate a spatial correlation matrix $R_{33}$, including three rows, three columns, and a total of nine entries. As discussed above, each entry may be a deterministic weight $w_j$ representing a spatial correlation between respective antennas 102, 104, and 106. For example, weight $w_{102, 104}$ may represent a spatial correlation between antenna 102 and antenna 104 in the j-direction. An example of this matrix is illustrated in FIG. 6.

Returning to FIG. 5, at step S710, after generating this spatial correlation matrix $R_{yy}$, the access network 100 may select an optimum deterministic weight from the spatial correlation matrix $R_{yy}$. For example, the access network 100 may select an optimum deterministic weight by evaluating a long-term average spatial correlation matrix $R_{yy}(l)$ for an l-th multipath in a reverse link channel. That is, for example, the optimum deterministic weight may correspond to the deterministic weight $w_j$, which maximizes the value of $\beta_j$ given by:

$$\beta_j = \sum_l w_j^H R_{yy}(l) w_j.$$

After selecting an optimum deterministic weight, the access network may select a pilot from the static matrix of possible pilots (discussed above), based on the optimum deterministic weight, at step S720. For example, the access network 100 may select the pilot having a weight closest to the optimum deterministic weight as the secondary pilot. The access network 100 may then allocate the selected pilot as the secondary pilot at step S730.

Implicit pilot selection, according to example embodiments of the present invention, may be performed, for example, when an access terminal 124 is engaged in either the call setup phase, using the reverse link random access channel or during the duration of a call, for example, continuously. The averaging length for estimating the spatial correlation matrix may vary depending on the characteristics of the air interface.

Each of the methods for explicit pilot selection and implicit pilot selection, according to example embodiment of the present invention, may be used alone or in conjunction with one another. Furthermore, each of the implicit selection method and explicit pilot selection method may be more suitable for a different mobility condition. For example, extra power required by the introduction of the explicit pilot selection channel may be used in connection with faster moving access terminals while the implicit pilot selection may be used in connection with access terminals, which may have a higher delay tolerance. Circuitry, which may enable implicit pilot selection, may be the same as that, which may be used to admit an access terminal to an access network and/or allocate a secondary pilot to the access terminal during, for example, call setup.

An example of a method for determining a maximum forward link data rate using a secondary pilot channel, according to an example embodiment of the present invention, will now be described with regard to FIG. 1.

Referring to FIG. 1, after selecting access network 100 as a serving access network, the access terminal 124 may determine a maximum forward link data rate based on a measured characteristic of a secondary pilot or a measured channel characteristic of the secondary pilot channel P114. Namely, the access terminal 124 may measure a signal-to-interference and noise ratio (SINR) of a secondary pilot transmitted in the beam specific secondary pilot channel P114. Each access terminal may then use the measured SINR to predict a carrier to interference C/I ratio of a next transmission received by the access terminal 124. The predicted C/I is then used by the access terminal 124 in determining a maximum forward link data rate. The access terminal 124 may then transmit a control message to the access network 100 indicating the determined maximum forward link data rate. Namely, the access terminal 124 may send a data rate control (DRC) value (e.g., a four-bit DRC value) indicating the determined maximum forward link data rate.

The access network 100 may interpret the DRC transmission for the beam 110, and set a maximum data rate for a next transmission in the forward link channel between the access network 100 and the access terminal 124. The access network 100 may subsequently transmit data in the forward link direction to the access terminal 124 based on the set maximum data rate for transmission.

Figure 7:
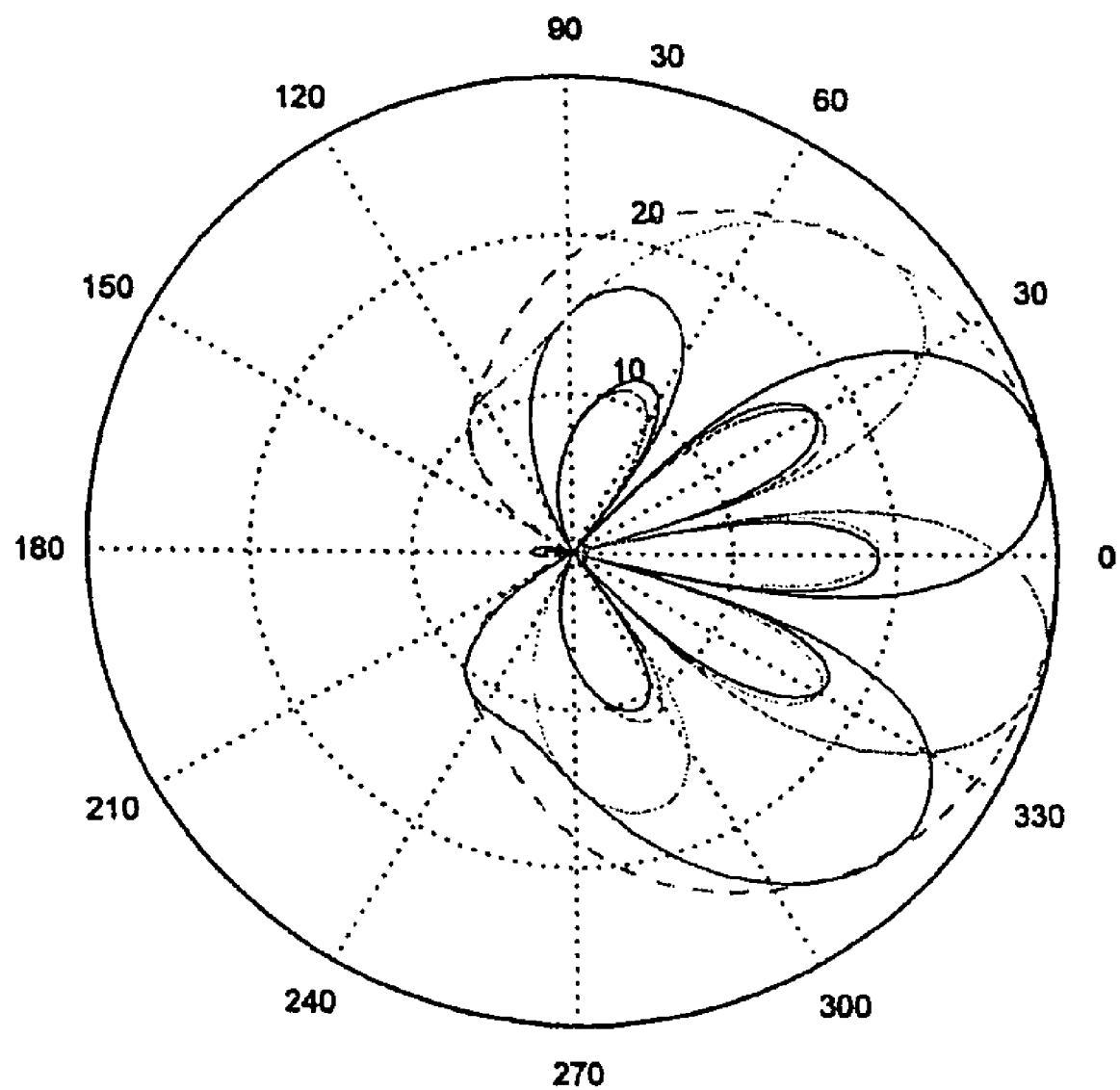
FIG. 7 is a graph illustrating a sector of a wireless communication system including a plurality of spatially distinct beams.

Unlike conventional wireless communication systems, in example embodiments of the present invention maximum forward link data rates may be determined based on a signal-to-interference and noise ratio of a secondary pilot channel, which more accurately reflects conditions in the specific beam received by the access terminal FIG. 7 illustrates an example of a beamformed sector with 4 spatially distinct beams. A discussion of possible improvements in the throughput, which may be achieved by example embodiments of the present invention, will now be described with regard to FIG. 7. In example embodiments of the present invention, each of the spatially distinct beams may be supported by an individual secondary pilot channel, and access terminals in each beam may report respective data rate control messages based on the SINR of the individual beamformed secondary pilots. Using the measured SINR of individual beamformed secondary pilots the array gain may be improved and the achievable rate may be given by:

$$R = W \log_2(1 + N\rho).$$

This is an example of a gain, which may be achieved by a scheduling approach, which may schedule one or multiple time multiplexed users in one beam at a time.

In another example, if two access terminals are scheduled at a time, transmission power allocated to each access terminal may be reduced by, for example, a factor of 2, and the achievable data transmission rate may be given by:

$$R = 2W \log_2(1 + N\rho/2)$$

Thus, the maximum achievable data rate R may be increased.

Although example embodiments of the present invention have been described with respect to a specific example above, it will be understood that more intelligent scheduling approaches may be used and power may be allocated on a per beam basis depending on the needs of the users served at the time.

Example embodiments of the present invention may utilize a secondary pilot channels in implementing SDMA in both the forward and reverse link directions.

Example embodiments of the present invention provide a technique, which may achieve spectral efficiency improvements in, for example, macro cells using Spatial Division Multiple Access (SDMA). Although example embodiments of the present invention have been discussed with regard to the access network 100 illustrated in FIG. 1, it will be understood that example embodiments of the present invention may be implemented in, or used in conjunction with, any suitable wireless telecommunications system.

Examples of suitable wireless communication systems may be Orthogonal Frequency Code Division Multiple Access (OFCDMA), Orthogonal Frequency Division Multiple Access (OFDMA), Code Division Multiple Access (CDMA) systems, and/or etc.

SDMA, as discussed herein, may refer to the spatial reuse of code and/or subcarrier resources within sectors of OFCDMA, CDMA and/or OFDMA systems.

Although the above discussion is discussed with regard to the forward link. SDMA enhancements may be implemented in the reverse link.

Example embodiments of the present invention have been discussed with regard to an interaction between, for example, access network 100 and access terminal 130. However, it will be understood that multiple access terminals (e.g., 124, 126, etc.) may interact in the same manner with the same or different access networks in parallel.

Example embodiments of the present invention have been described with regard to specific Walsh codes and/or Walsh covers. However, it will be understood that any suitable Walsh code and/or Walsh cover may be used.

Although FIG. 1 illustrates three fixed beam antennas 102, 103, and 106 may provide three fixed beams 10, 112 and 114, a wireless communication system may include any suitable number of fixed beam antennas and fixed beams.

Example embodiments of the present invention have been described with regard to determining a maximum forward link data rate. However, it will be understood that the secondary pilot channels, as discussed herein, may be used by access terminals for, for example, initial acquisition, phase recovery, timing recovery, and/or maximal-ratio combining.

The invention being thus described, it will be obvious that the same may be varied in many ways. Such variations are not to be regarded as a departure from the invention, and all such modifications are intended to be included within the scope of the invention.

We claim:

1. A method for wireless communication in a beamformed network including a plurality of beams, the method comprising:

transmitting, by a serving access network, a primary pilot to access terminals served by the serving access network, the primary pilot identifying the serving access network as a source of transmission;

allocating, by the serving access network, a secondary pilot to at least one of the plurality of beams based on a selection signal received from an access terminal within the at least one beam, the secondary pilot being in addition to the primary pilot, and the selection signal including one of, an explicit indication of a selected beam over which the access terminal receives data, and an implicit indicator informing the serving access network to allocate the secondary pilot based on signals associated with two or more antennas associated with the beamformed network; and transmitting the secondary pilot to at least one access terminal.

2. The method of claim 1, wherein the number of secondary pilots are beamformed.

3. The method of claim 1, further comprising:
transmitting data at or below a data rate determined based on at least one characteristic of a secondary pilot.

4. The method of claim 3, wherein the characteristic is a signal-to-interference and noise ratio.

5. The method of claim 3, further comprising:
receiving a control message indicating the determined data rate; and
transmitting data at or below the determined data rate in response to the received control message.

6. The method of claim 5, wherein the control message is a Data Rate Control (DRC) message.

7. The method of claim 1, wherein the selection signal is received over a portion of a control channel.

8. The method of claim 7, wherein the portion of the control channel is a portion of a data source control (DSC) channel.

9. The method of claim 7, wherein the portion of the control channel is an explicit pilot signal portion of the control channel.

10. The method of claim 3, further comprising:
allocating a secondary pilot for each beam;
receiving an indicator indicating the determined data rate;
selecting a beam for transmitting data based on the received indicator; and
transmitting data at or below the determined data rate based on the received indicator.

11. The method of claim 10, wherein each of the secondary pilots are orthogonal to one another.

12. The method of claim 10, wherein each of the secondary pilots are chip synchronous.

13. The method of claim 3, further comprising:
receiving a signal initiating transmission by an access terminal; and
allocating a wireless transmission channel to the access terminal including a primary pilot and at least one secondary pilot.

14. The method of claim 13, wherein the signal is received over a data source control channel.

15. The method of claim 10, wherein each of the secondary pilots are orthogonal to the primary pilot.

16. The method of claim 15, wherein the secondary pilots are allocated from a matrix.

17. The method of claim 16, wherein the matrix is a Hadamard matrix.

18. A method for wireless communication in a beam formed network including a plurality of beams, the method comprising:
receiving, at an access terminal, a primary pilot from a serving access network, the primary pilot identifying the serving access network as a source of transmission;
transmitting, by the access terminal, a selection signal to the serving access network; and
receiving, at the access terminal, at least one secondary pilot from the serving access network, the secondary pilot being in addition to the primary pilot and allocated by the service access network based on the selection signal and being associated with one of the plurality of beams in which terminal the access terminal is located, the selection signal including one of,
an explicit indication of a selected beam over which the access terminal receives data, and
an implicit indicator informing the serving access network to allocate the secondary pilot based on signals associated with two or more antennas associated with the beamformed network.

19. The method of claim 18, further comprising:
determining a data rate based on a channel characteristic of the secondary pilot;
indicating the determined data rate to a network; and
receiving data at or below the determined data rate.

20. The method of claim 19, wherein the channel characteristic is a signal-to-noise ratio.

* * * * *